Figure 1:
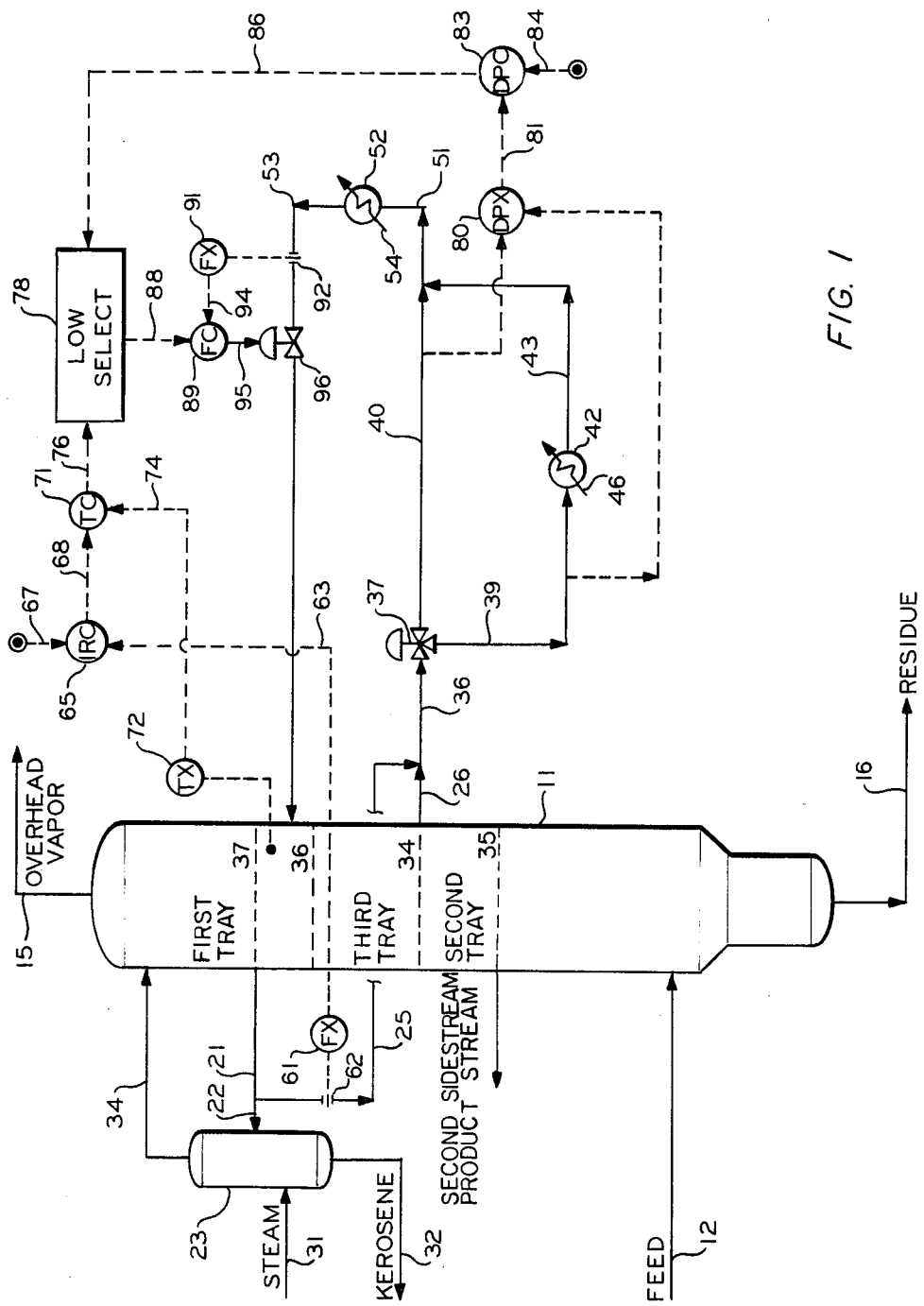

United States Patent [19]

Jain

[11] Patent Number: 4,560,442
[45] Date of Patent: Dec. 24, 1985

[54] FRACTIONAL DISTILLATION PROCESS CONTROL

[75] Inventor: Gyan P. Jain, Bartlesville, Okla.

[73] Assignee: Phillips Petroleum Company, Bartlesville, Okla.

[21] Appl. No.: 589,915

[22] Filed: Mar. 15, 1984

[51] Int. Cl.$^4$ .............................................. B01D 3/42
[52] U.S. Cl. ........................................ 203/2; 203/1; 203/3; 203/99; 203/DIG. 19; 202/160; 202/206; 208/DIG. 1; 364/501
[58] Field of Search ................ 203/1, 2, 3, DIG. 18, 203/DIG. 19, 99; 202/160, 206; 364/501; 208/DIG. 1; 196/132

[56] References Cited

U.S. PATENT DOCUMENTS

| | | | |
|---|---|---|---|
| 2,081,601 | 5/1937 | Ridgway | 208/DIG. 1 |
| 2,160,256 | 5/1939 | Aldridge et al. | 208/DIG. 1 |
| 2,222,583 | 11/1940 | Kraft | 208/DIG. 1 |
| 3,338,825 | 8/1967 | Taggart | 203/2 |
| 3,392,088 | 7/1968 | Johnson | 203/2 |
| 3,463,725 | 8/1969 | MacFarlane et al. | 208/DIG. 1 |
| 4,096,574 | 6/1978 | Christie | 364/501 |
| 4,246,070 | 1/1981 | Hofferber | 208/DIG. 1 |
| 4,289,588 | 9/1981 | Hofferber | 208/DIG. 1 |
| 4,350,569 | 9/1982 | Furr | 203/2 |
| 4,367,121 | 1/1983 | Furr | 203/2 |

Primary Examiner—S. Leon Bashore
Assistant Examiner—V. Manoharan
Attorney, Agent, or Firm—French and Doescher

[57] ABSTRACT

A desired separation between sidedraw product streams withdrawn from a fractional distillation column is maintained by controlling the flow rate of the external reflux associated with a particular sidedraw product stream in response to the output signal from a temperature controller which is reset by an internal reflux controller. Such cascade control improves the stability of a fractionation process and provides for good control of the separation between sidedraw product streams.

8 Claims, 1 Drawing Figure

FRACTIONAL DISTILLATION PROCESS CONTROL

This invention relates to control of a fractional distillation process. In one aspect, this invention relates to method of apparatus for maintaining a desired product separation for a fractional distillation process having multiple side products and multiple external refluxes.

Fractional distillation columns are employed in many processes to make desired separations. The separations may range from single component separations to the more complex multiple separations performed by crude distillation towers. Typically, a feed stream containing at least first and second components is supplied to the fractional distillation column. A substantial portion of the first component contained in the feed stream is removed from the fractional distillation column as an overhead product and a substantial portion of the second component in the feed stream is removed from the fractional distillation process as a bottoms product. Heat is generally supplied to the fractional distillation column in order to effect the desired separation or the feed may be preheated.

In many fractional distillation processes such as crude distillation, fractionation of the effluent from a catalytic cracker, hydrodesulfurizing fractionators, vacuum towers and coker fractionators, a plurality of sidedraw streams will be withdrawn in addition to the overhead stream and the bottom stream. Also, in such processes plural external refluxes are returned to the fractional distillation column.

In the past it has been common to control separation between the side products by controlling internal reflux flow rates in the fractionator. The internal reflux flow rates are controlled by manipulating the external reflux flow rates. However, control based directly on internal reflux requires that the external refluxes must be manipulated slowly to avoid interaction between product quality controllers and external reflux controllers and to avoid interaction between different reflux controllers. Such a control scheme works if the magnitude and frequency of disturbances caused by changes in the feed composition, feed temperature or heat required by other processes using the side refluxes as a source of heat is low. However, when the frequency of disturbances is high, then the slow manipulation of the external refluxes causes disturbances to propagate in the fractional distillation column which leads to undesirable operation and in particular leads to off specification sidedraw products.

It is thus an object of this invention to provide method and apparatus for controlling a fractional distillation column so as to maintain desired separation between the sidedraw products when process upsets are minimal and also when process upsets occur frequently.

In accordance with the present invention, method and apparatus is provided whereby a temperature controller which is reset by an internal reflux controller is utilized to maintain a desired flow rate of the external reflux associated with a particular sidedraw product stream. It has been found that this cascade control improves stability of the fractionation process and provides for good control of the separation between the sidedraw product streams.

Other objects and advantages of the invention will be apparent from the foregoing brief description of the invention and from the claims as well as from the detailed description of the drawing which is briefly described as follows:

The FIGURE is a diagramatic illustration of a fractional distillation process and the associated control system of the present invention.

The invention is illustrated in terms of a crude tower. However, the invention is applicable to any fractional distillation process where sidedraw product streams are withdrawn from the fractional distillation process and an external reflux associated with such sidedraw product streams is returned to the fractional distillation process. As has been previously stated, examples of such processes are catalytic cracking fractionators, hydrodesulfurizing fractionators, vacuum towers and coker fractionators.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention is implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, there is illustrated a crude tower 11. A crude oil feed is provided to the crude tower 11 through conduit means 12. The feed flowing through conduit means 12 will generally be preheated and, for the crude tower to which the present invention was applied, the feed was heated to the point that the desired separation could be accomplished without the addition of additional heat to the fluid in the lower portion of the crude tower 11.

An overhead vapor stream is withdrawn from the upper portion of the distillation column 11 through conduit means 15. The overhead vapor stream would generally be provided to an overhead accumulator with a first portion of the liquid in the overhead accumulator being withdrawn as an overhead product stream and a second portion of the liquid in the overhead accumulator being returned as an upper external reflux. However, since these streams are not required for a description of the present invention, these streams have not been illustrated and described more fully for the sake of clarity.

A bottom stream containing residue is withdrawn from the fractional distillation column 11 through conduit means 16.

Several sidedraw product streams such as kerosene and various fractions of gas oil would generally be withdrawn from a crude tower. However, since only one sidedraw product stream is required to illustrate the present invention, only one sidedraw product stream is fully illustrated in FIG. 1 and described hereinafter. This sidedraw product stream is the upper sidedraw product stream which is typically kerosene.

For the particular crude tower to which the present invention was applied, an upper sidedraw stream was withdrawn from tray 37, which is a total trap tray, through conduit means 21. A first portion of the thus withdrawn upper sidedraw stream is provided through conduit means 22 to the stripper 23. The fluid flowing through conduit means 22 is referred to hereinafter as the sidedraw product feed stream. A second portion of the thus withdrawn upper sidedraw stream flowing through conduit means 21 is withdrawn through conduit means 25 and combined with the pump-around fluid flowing through conduit means 26 to form an external reflux stream which will be described hereinafter.

Steam stripping is utilized in the stripper 23 to separate the lighter components from the sidedraw product feed stream flowing through conduit means 22. Steam is provided to the stripper 23 through conduit means 31. Kerosene is withdrawn as a separated sidedraw product from the stripper 23 through conduit means 32. Vapors, including steam, are withdrawn from the stripper 23 and returned to the upper portion of the fractional distillation column 11 through conduit means 34.

The fluid flowing through conduit means 25 is combined with the pump-around fluid flowing through conduit means 26, which was withdrawn from tray 34 of the particular crude tower to which the present invention was applied, to form an external reflux stream which flows through conduit means 36. The fluid flowing through conduit means 36 is passed through the three way control valve 37 and is divided into fluid streams flowing through conduit means 39 and 40. The fluid flowing through conduit means 39 is passed through the heat exchanger 42 and is then withdrawn through conduit means 43 and recombined with the fluid flowing through conduit means 40.

In many chemical manufacturing processes, a number of fractional distillation columns or other processing units may be employed. In such processes, it is common to use heat from one unit to supply heat to another unit. As an example of this, the fluid flowing through conduit means 46 will be considered to be the fluid from another process which is to be heated. It is noted that a number of heat exchangers for fluid from a plurality of processes could be located between conduit means 39 and 43. The effect on the crude tower 11 of supplying heat to other processes will be described more fully hereinafter.

The combination of the fluid flowing through conduit means 40 and 43 is provided through conduit means 51 to the heat exchanger 52. The heat exchanger 52 is provided with a cooling fluid through conduit means 54. This cooling fluid will generally not be provided from another process but will be a fluid, such as water, the temperature of which can be controlled. After passing through the heat exchanger 52, the fluid flowing through conduit means 51 is provided through conduit means 53 to a point above tray 36 in the crude tower to which the present invention was applied. The fluid flowing through conduit means 53 is considered to be the side external reflux associated with the kerosene sidedraw stream.

As described to this point, the crude tower illustrated in FIG. 1 is a conventional crude tower. As has been previously noted, other sidedraw streams would be withdrawn from the crude tower and the next lower sidedraw stream is shown as being withdrawn from tray 35 but such next lower sidedraw stream is not more fully described because it is conventional. Also, other conventional fractional distillation process equipment such as pumps, additional heat exchangers, etc. would be utilized. However, such additional process equipment have not been illustrated for the sake of clarity since such additional process equipment plays no part in the present invention.

The manner in which the fractional distillation process illustrated in FIG. 1 is controlled in accordance with the present invention is as follows:

Flow transducer 61 in combination with flow sensor 62, which is operably located in conduit means 25, provides an output signal 63 which is representative of the flow rate of fluid through conduit means 25. Signal 63 is provided from the flow transducer 61 as the process variable input to the internal reflux controller 65.

As has been previously stated, tray 37 is a total trap tray. Thus, all fluid must be withdrawn from tray 37 through conduit means 21. Signal 63 is thus representative of the flow rate of the portion of the fluid at tray 37 which is not withdrawn as the sidedraw product feed through conduit 22.

If the particular fractional distillation column to which the control of the present invention is applied does not contain total trap trays, the sidedraw stream flowing through conduit 21 will typically not be split and this stream would be considered the sidedraw product feed stream. However, a signal equivalent to signal 63 can still be determined by calculating the internal reflux flow rate at the tray and then subtracting the sidedraw product feed withdrawal rate to establish a signal equivalent to signal 63.

The actual internal reflux at any particular tray can be reliably calculated by mass and heat balances around the fractionator. An example of such calculations is illustrated in U.S. Pat. No. 3,224,947.

Signal 67, which is representative of the flow rate of fluid through conduit 25 required to maintain a desired separation between the kerosene product stream and the next lower sidedraw product stream (generally naphtha) withdrawn from tray 35 is provided as the set point input to the internal reflux controller 65.

For the particular tower to which the present invention was applied, signal 67 had a magnitude in the range of about 5 to about 15 $M^3$/hr. The precise magnitude of signal 67 for any tower may be determined by experimentation.

In response to signals 63 and 67, the internal reflux controller 65 provides an output signal 68 which is responsive to the difference between signals 63 and 67. Signal 68 is scaled so as to be representative of the temperature in the fractional distillation column in the area where the sidedraw stream 21 is withdrawn required to maintain a desired separation between the kerosene product stream and the naphtha sidedraw product stream. Signal 68 is provided from the internal reflux controller 65 as the set point input to the temperature controller 71.

It is noted that controller 65 is referred to as an internal reflux controller even though neither the process variable (signal 63) nor set point (signal 67) supplied to controller 65 is representative of a total internal reflux flow rate. However, this designation is used because the flow of fluid through conduit 25 directly effects the internal reflux flow rate.

The essential feature of the internal reflux portion of the cascaded control is the determination of the actual flow rate of fluid at tray 37 which is not withdrawn through conduit 22 and the comparison of this actual flow rate to a desired flow rate. For a total trap tray the actual flow rate can be measured. However, even if a total trap tray is not used and the flow of fluid through conduit 21 is not split, the actual flow rate can be calculated.

Temperature transducer 72 in combination with a temperature sensing device such as a thermocouple, which is operably located below tray 37 in the fractional distillation column 11, provides an output signal 74 which is representative of the actual temperature in the area of the fractional distillation column 11 from which the sidedraw stream 21 is withdrawn. Signal 74 is provided as the process variable input to the temperature controller 71.

In response to signals 68 and 74, the temperature controller 71 provides an output signal 76 which is responsive to the difference between signals 68 and 74. Signal 76 is scaled so as to be representative of the flow rate of the side external reflux flowing through conduit means 53 required to maintain a desired temperature in the area of the fractional distillation column 11 from which sidedraw stream 21 is withdrawn. Signal 76 is provided from the temperature controller 71 as a first input to the low select 78.

As has been previously stated, the fluid flowing through conduit means 46 is representative of fluid from a different process which is heated by the fluid flowing through conduit means 39. Several fluid streams from other processes could be heated in this manner. However, in other fractional distillation processes, the fluid flowing through conduit means 36 might not be split but would be provided directly to the heat exchanger 52 for cooling. In such a case, the differential pressure control discussed hereinafter would not be applicable.

Control valve 37 is a manual control valve. Control valve 37 is set at a point where, under average circumstances, the flow of fluid through conduit means 39 will be sufficient to satisfy the heat duty required by the various process streams being heated by the fluid flowing through conduit means 39. However, during periods of changing heat duty, it is desirable to be able to override the control of the flow rate of the side external reflux flowing through conduit means 53 based on the cascaded internal reflux and temperature control so as to insure that sufficient fluid is flowing through conduit means 39 to satisfy at least a minimum heat duty demanded of the fluid flowing through conduit means 39 by the various process streams being heated by the fluid flowing through conduit means 39. This is accomplished in accordance with the present invention as described hereinafter.

Differential pressure transducer 80, in combination with pressure sensing devices located in conduit means 40 and 39 respectively, provides an output signal 81 which is representative of the actual differential pressure between conduit means 39 and 40. Signal 81 is provided from the differential pressure transducer 80 as the process variable input to the differential pressure controller 83.

Differential pressure controller 83 is also supplied with a set point signal 84 which is representative of the differential pressure which must be maintained to insure that the heat duty required of the fluid flowing through conduit means 39 is satisfied. In response to signals 81 and 84, the differential pressure controller 83 provides an output signal 86 which is responsive to the difference between signals 81 and 84. Signal 86 is scaled so as to be representative of the flow rate of the upper side external reflux flowing through conduit means 53 required to maintain a desired differential pressure between conduit means 39 and 40 so as to insure that the flow of fluid through conduit means 39 will be sufficient to satisfy the heat duty required of such fluid. Signal 86 is provided from the differential pressure controller 83 as a second input to the low select 78.

Signals 76 and 86 will each be representative of a flow rate. The signal which is representative of the lowest flow rate will be provided from the low select 78 as signal 88 to the flow controller 89.

Flow transducer 91 in combination with the flow sensor 92, which is operably located in conduit means 53, provides an output signal 94 which is representative of the actual flow rate of the upper side external reflux flowing through conduit means 53. Signal 94 is provided from the flow transducer 91 as the process variable input to the flow controller 89.

In response to signals 88 and 94, the flow controller 89 provides an output signal 95 which is responsive to the difference between signals 88 and 94. Signal 95 is scaled so as to be representative of the position of the control valve 96, which is operably located in conduit means 53, required to maintain the actual flow rate of the side external reflux flowing through conduit means 53 substantially equal to the desired flow rate represented by signal 88. Signal 95 is provided from the flow controller 89 as the control signal for the control valve 96 and the control valve 96 is manipulated in response thereto.

In summary with respect to the control system illustrated in FIG. 1, signal 76 will generally be selected as signal 88. Only during periods of process upsets for processes using heat supplied by the fluid flowing through conduit means 39 will signal 86 be selected as signal 88. Thus, the flow rate of the upper side external reflux flowing through conduit means 53 will generally be manipulated in response to the cascaded internal reflux and temperature controllers. It has been found that such cascaded control is more effective at maintaining desired separation between product compositions than a direct control based on internal reflux.

In summary for the invention as a whole, the control system illustrated in FIG. 1 would generally be applied to all sidedraw streams having an associated external reflux. Application of the control system in this manner results in a good separation between the various sidedraw products even during periods of process upset. Meeting the desired separation requirements helps to obtain sidedraw products having desired specifications which is the desired effect of control of a crude tower in accordance with the present invention.

The invention has been described in terms of a preferred embodiment as illustrated in FIG. 1. Suitable control components such as flow transducers 61 and 91, temperature transducer 72, differential pressure transducer 80, controllers 65, 71, 89 and 83; and control valves 96 and 37 are each well known, commercially available control components such as are described at length in Perry's Chemical Engineer's Handbook 4th Edition, Chapter 22, McGraw-Hill.

The low select 78 may be implemented using well known electrical components or may be implemented on a digital computer such as the OPTROL 7000 manufactured by Applied Automation Inc. It is also noted that, if a digital computer such as the OPTROL 7000 is available, all of the controllers illustrated in FIG. 1 may be implemented on such a computer although controller 89 would generally not be implemented on a computer even if a computer were available.

While the invention has been described in terms of a presently preferred embodiment, reasonable variations and modifications are possible by those skilled in the art. Such variations and modifications are within the scope of the present invention as claimed.

That which is claimed is:

1. Apparatus comprising:

a fractional distillation column;

means for providing a feed stream to said fractional distillation column, wherein components contained in said feed stream are at least partially separated in said fractional distillation column;

means for withdrawing a first sidedraw product feed stream from a first tray of said fractional distillation column;

means for withdrawing a second sidedraw product feed stream from a second tray of said fractional distillation column;

means for withdrawing a pump-around stream from a third tray of said fractional distillation column, wherein said first tray is above said second tray and said third tray is between said first tray and said second tray;

a first heat exchanger;

means for providing a cooling fluid to said first heat exchanger;

means for passing said pump-around stream through said first heat exchanger and for returning the cooled pump-around stream to said fractional distillation column at a point between said first tray and said third tray as a side external reflux stream;

means for establishing a first signal representative of the actual flow rate of fluid at said first tray which is not a part of said first sidedraw product feed stream;

means for establishing a second signal representative of the flow rate of fluid at said first tray, which is not a part of said first sidedraw product feed stream, required to maintain a desired separation between a first sidedraw product stream produced from said first sidedraw product feed stream and a second sidedraw product stream produced from said second sidedraw product feed stream;

means for comparing said first signal and said second signal and for establishing a third signal which is responsive to the difference between said first signal and said second signal, wherein said third signal is scaled so as to be representative of the temperature in said fractional distillation column in the area of said first tray required to maintain a desired separation between said first sidedraw product stream and said second sidedraw product stream;

means for establishing a fourth signal representative of the actual temperature in said fractional distillation column in the area of said first tray;

means for comparing said third signal and said fourth signal and for establishing a fifth signal which is responsive to the difference between said third signal and said fourth signal, wherein said fifth signal is scaled so as to be representative of the flow rate of said side external reflux stream required to maintain the desired temperature represented by said third signal; and means for manipulating the flow rate of said side external reflux stream in response to said fifth signal to thereby maintain the actual flow rate of said side external reflux stream substantially equal to the desired flow rate represented by said fifth signal.

2. Apparatus in accordance with claim 1 wherein said first tray is a total trap tray and wherein said means for withdrawing said first sidedraw product feed stream from said fractional distillation column comprises:

first conduit means for withdrawing a sidedraw stream from said first tray of said fractional distillation column; and means for dividing the fluid flowing through said first conduit into said first sidedraw product feed stream and a reflux fluid stream, wherein said first signal is representative of the flow rate of said reflux fluid stream.

3. Apparatus in accordance with claim 2 additionally comprising:

means for combining said reflux fluid stream and said pump-around stream, before said pump-around stream is passed through said first heat exchanger, to form a combined stream;

means for splitting said combined stream into a first process stream and a second process stream and for combining said first process stream and said second process stream to form said side external reflux stream, wherein said second process stream is utilized to provide heat to at least one fluid stream;

means for establishing a sixth signal representative of the actual differential pressure between said first process stream and said second process stream;

means for establishing a seventh signal representative of the differential pressure between said first process stream and said second process stream required to maintain a flow rate of said second process stream sufficient to supply the heat required by said at least one fluid stream;

means for comparing said sixth signal and said seventh signal and for establishing an eighth signal which is responsive to the difference between said sixth signal and said seventh signal, wherein said eighth signal is scaled so as to be representative of the flow rate of said side external reflux stream required to maintain the desired differential pressure represented by said seventh signal;

a low select; and means for providing said fifth signal and said eighth signal to said low select, wherein said low select provides a ninth signal which is representative of the one of said fifth and seventh signals which is representative of the lowest flow rate and wherein the flow rate of said side external reflux stream is manipulated in response to said ninth signal.

4. Apparatus in accordance with claim 1 wherein said means for manipulating the flow rate of said side external reflux stream in response to said fifth signal comprises:

a control valve operably located so as to control the flow of said side external reflux stream;

means for establishing a sixth signal representative of the actual flow rate of said side external reflux stream;

means for comparing said fifth signal and said sixth signal and for establishing a seventh signal which is responsive to the difference between said fifth signal and said sixth signal, wherein said seventh signal is scaled so as to be representative of the position of said control valve required to maintain the actual flow rate of said side external reflux stream substantially equal to the desired flow rate represented by said fifth signal; and means for manipulating said control valve in response to said seventh signal.

5. A method for maintaining a desired separation between a first sidedraw product stream produced from a first sidedraw product feed stream withdrawn from a first tray of a fractional distillation column and a second sidedraw product stream produced from a second sidedraw product feed stream withdrawn from a second tray of said fractional distillation column, wherein a feed stream provided to said fractional distillation column is at least partially separated in said fractional distillation column to produce said first sidedraw product feed stream and said second sidedraw product feed stream, wherein a pump-around stream is withdrawn from a third tray of said fractional distillation column, cooled and then returned to said fractional distillation column at a point between said first tray and said third tray as a side external reflux stream and wherein said first tray is above said second tray and said third tray is between said first tray and said second tray, said method comprising the steps of:

establishing a first signal representative of the actual flow rate of fluid at said first tray which is not a part of said first sidedraw product feed stream;

establishing a second signal representative of the flow rate of fluid at said first tray, which is not a part of said first sidedraw product feed stream, required to maintain a desired separation between said first sidedraw product stream and said second sidedraw product stream;

comparing said first signal and said second signal and establishing a third signal which is responsive to the difference between said first signal and said second signal, wherein said third signal is scaled so as to be representative of the temperature in said fractional distillation column in the area of said first tray required to maintain a desired separation between said first sidedraw product stream and said second sidedraw product stream;

establishing a fourth signal representative of the actual temperature in said fractional distillation column in the area of said first tray;

comparing said third signal and said fourth signal and establishing a fifth signal which is responsive to the difference between said third signal and said fourth signal, wherein said fifth signal is scaled so as to be representative of the flow rate of said side external reflux stream required to maintain the desired temperature represented by said third signal; and manipulating the flow rate of said side external reflux stream in response to said fifth signal to thereby maintain the actual flow rate of said side external reflux stream substantially equal to the desired flow rate represented by said fifth signal.

6. A method in accordance with claim 5 wherein said first tray is a total trap tray and wherein said first sidedraw product feed stream is withdrawn from said fractional distillation column by the steps of:

withdrawing a sidedraw stream from said first tray of said fractional distillation column; and dividing said sidedraw stream into said first sidedraw product feed stream and a reflux fluid stream, wherein said first signal is representative of the flow rate of said reflux fluid stream.

7. A method in accordance with claim 6 additionally comprising the steps of:

combining said reflux fluid stream and said pump-around stream, before said pump-around stream is cooled, to form a combined stream;

splitting said combined stream into a first process stream and a second process stream;

combining said first process stream and said second process stream to form said side external reflux stream, wherein said second process stream is utilized to provide heat to at least one fluid stream;

establishing a sixth signal representative of the actual differential pressure between said first process stream and said second process stream;

establishing a seventh signal representative of the differential pressure between said first process stream and said second process stream required to maintain a flow rate of said second process stream sufficient to supply the heat required by said at least one fluid stream;

comparing said sixth signal and said seventh signal and establishing an eighth signal which is responsive to the difference between said sixth signal and said seventh signal, wherein said eighth signal is scaled so as to be representative of the flow rate of said side external reflux stream required to maintain the desired differential pressure represented by said seventh signal; and establishing a ninth signal which is representative of the one of said fifth and seventh signals which is representative of the lowest flow rate and wherein the flow rate of said side external reflux stream is manipulated in response to said ninth signal.

8. A method in accordance with claim 5 wherein said step of manipulating the flow rate of said side external reflux stream in response to said fifth signal comprises:

establishing a sixth signal representative of the actual flow rate of said side external reflux stream;

comparing said fifth signal and said sixth signal and establishing a seventh signal which is responsive to the difference between said fifth signal and said sixth signal, wherein said seventh signal is scaled so as to be representative of the position of a control valve, which is operably located so as to control the flow of said side external reflux stream, required to maintain the actual flow rate of said side external reflux stream substantially equal to the desired flow rate represented by said fifth signal; and manipulating said control valve in response to said seventh signal.

* * * * *